US012505469B2

(12) United States Patent
Stoica et al.

(10) Patent No.: US 12,505,469 B2
(45) Date of Patent: *Dec. 23, 2025

(54) ADVERTISING ENGINE

(71) Applicant: Conviva Inc., Foster City, CA (US)

(72) Inventors: Ion Stoica, Piedmont, CA (US); Hui Zhang, Pittsburgh, PA (US)

(73) Assignee: Conviva Inc., Foster City, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/236,364

(22) Filed: Apr. 21, 2021

(65) Prior Publication Data
US 2021/0334857 A1 Oct. 28, 2021

Related U.S. Application Data

(63) Continuation of application No. 12/380,982, filed on Mar. 4, 2009, now Pat. No. 11,017,436.

(60) Provisional application No. 61/068,018, filed on Mar. 4, 2008.

(51) Int. Cl.
G06Q 30/00 (2023.01)
G06Q 30/0242 (2023.01)
G06Q 30/0251 (2023.01)

(52) U.S. Cl.
CPC ..... *G06Q 30/0269* (2013.01); *G06Q 30/0242* (2013.01); *G06Q 30/0255* (2013.01)

(58) Field of Classification Search
None
See application file for complete search history.

(56) References Cited

U.S. PATENT DOCUMENTS

| 6,327,574 | B1 | 12/2001 | Kramer |
| 6,446,261 | B1 | 9/2002 | Rosser |
| 6,470,299 | B1 | 10/2002 | Vora |
| 7,818,419 | B1 * | 10/2010 | McAllister ......... G06Q 30/0244 709/224 |
| 7,844,491 | B1 | 11/2010 | Haitsuka |
| 8,677,020 | B2 | 3/2014 | Levkovitz |
| 2001/0049620 | A1 | 12/2001 | Blasko |
| 2002/0023002 | A1 | 2/2002 | Staehelin |
| 2002/0123928 | A1 | 9/2002 | Eldering |
| 2003/0177064 | A1 | 9/2003 | Emura |
| 2005/0055327 | A1 | 3/2005 | Agrawal |

(Continued)

FOREIGN PATENT DOCUMENTS

| CN | 101427276 A * | 5/2009 | ............ G06Q 30/02 |
| WO | WO-0193524 A2 * | 12/2001 | ............ G06Q 30/02 |

(Continued)

OTHER PUBLICATIONS

Ari Juels, Targeted Advertising . . . And Privacy Too, Topics in Cryptology—CT-RSA 2001, 2001, pp. 408-424.

(Continued)

*Primary Examiner* — Michael Bekerman
(74) *Attorney, Agent, or Firm* — Van Pelt, Yi & James LLP

(57) ABSTRACT

Delivering an advertisement is disclosed. Local user information is collected. Examples of local user information include language settings, web browser history, and actions taken by a user with respect to various applications. An advertisement is selected from a plurality of advertisements based at least in part on the local user information. The selected advertisement is caused to be displayed.

39 Claims, 5 Drawing Sheets

(56) References Cited

U.S. PATENT DOCUMENTS

| | | |
|---|---|---|
| 2006/0265283 A1 | 11/2006 | Gorodyansky |
| 2007/0088838 A1 | 4/2007 | Levkovitz |
| 2007/0250383 A1 | 10/2007 | Tollinger |
| 2008/0004949 A1 | 1/2008 | Flake |
| 2008/0010133 A1 | 1/2008 | Seppo |
| 2008/0077491 A1* | 3/2008 | Robinson ........... G06Q 30/0277 |
| | | 705/14.64 |
| 2008/0108342 A1 | 5/2008 | Pomerantz |
| 2008/0207182 A1 | 8/2008 | Maharajh |
| 2008/0215428 A1* | 9/2008 | Ramer ................ G06Q 30/02 |
| | | 705/14.66 |
| 2008/0319828 A1 | 12/2008 | Southam |
| 2009/0006177 A1* | 1/2009 | Beaver ............... G06Q 30/0263 |
| | | 705/14.6 |
| 2009/0011740 A1 | 1/2009 | Aggarwal |
| 2009/0048977 A1 | 2/2009 | Aggarwal |
| 2009/0164287 A1 | 6/2009 | Kies |
| 2009/0216749 A1 | 8/2009 | Hardt |
| 2009/0319329 A1 | 12/2009 | Aggarwal |
| 2017/0262437 A1 | 9/2017 | Raichelgauz |

FOREIGN PATENT DOCUMENTS

| | | |
|---|---|---|
| WO | 0237278 | 5/2002 |
| WO | 2007148171 | 12/2007 |

OTHER PUBLICATIONS

Jaworska et al., Behavioural Targeting in On-Line Advertising: An Empirical Study, Web Information Systems Engineering—WISE 2008, 2008, pp. 62-76.

* cited by examiner

ADVERTISING ENGINE

CROSS REFERENCE TO OTHER APPLICATIONS

This application is a continuation of U.S. patent application Ser. No. 12/380,982, entitled ADVERTISING ENGINE filed Mar. 4, 2009 which is incorporated herein by reference for all purposes, which claims priority to U.S. Provisional Application No. 61/068,018, entitled ADVERTISING ENGINE filed Mar. 4, 2008 which is incorporated herein by reference for all purposes.

BACKGROUND OF THE INVENTION

Content publishers such as websites sometimes use third party advertising (ad) networks to facilitate the serving of advertisements (ads) to users. Typically, the serving of ads in such a scenario works as follows. The client requests a webpage from the publisher. The publisher sends the requested webpage to the client. Included in the page is a link (e.g., URL) pointing to the ad network that encodes (e.g., in its arguments) information about the webpage. When the user's browser displays the webpage, the browser contacts the ad network, via the link, to obtain an ad. In addition to the information embedded in the link provided by the publisher, the advertising network uses information such as the client type and version of the browser, and information that it maintains to select an ad. The ad network sends the selected ad to the client to be displayed in its web page. The ad network typically identifies a client either using a cookie, or the client's IP address.

Unfortunately, one problem with this model is that the advertising network has limited information upon which to base a determination of which advertisement to return to the user's browser. Compounding the problem is that users typically desire to protect their privacy and do not generally wish additional information about themselves to be made available to advertisers.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
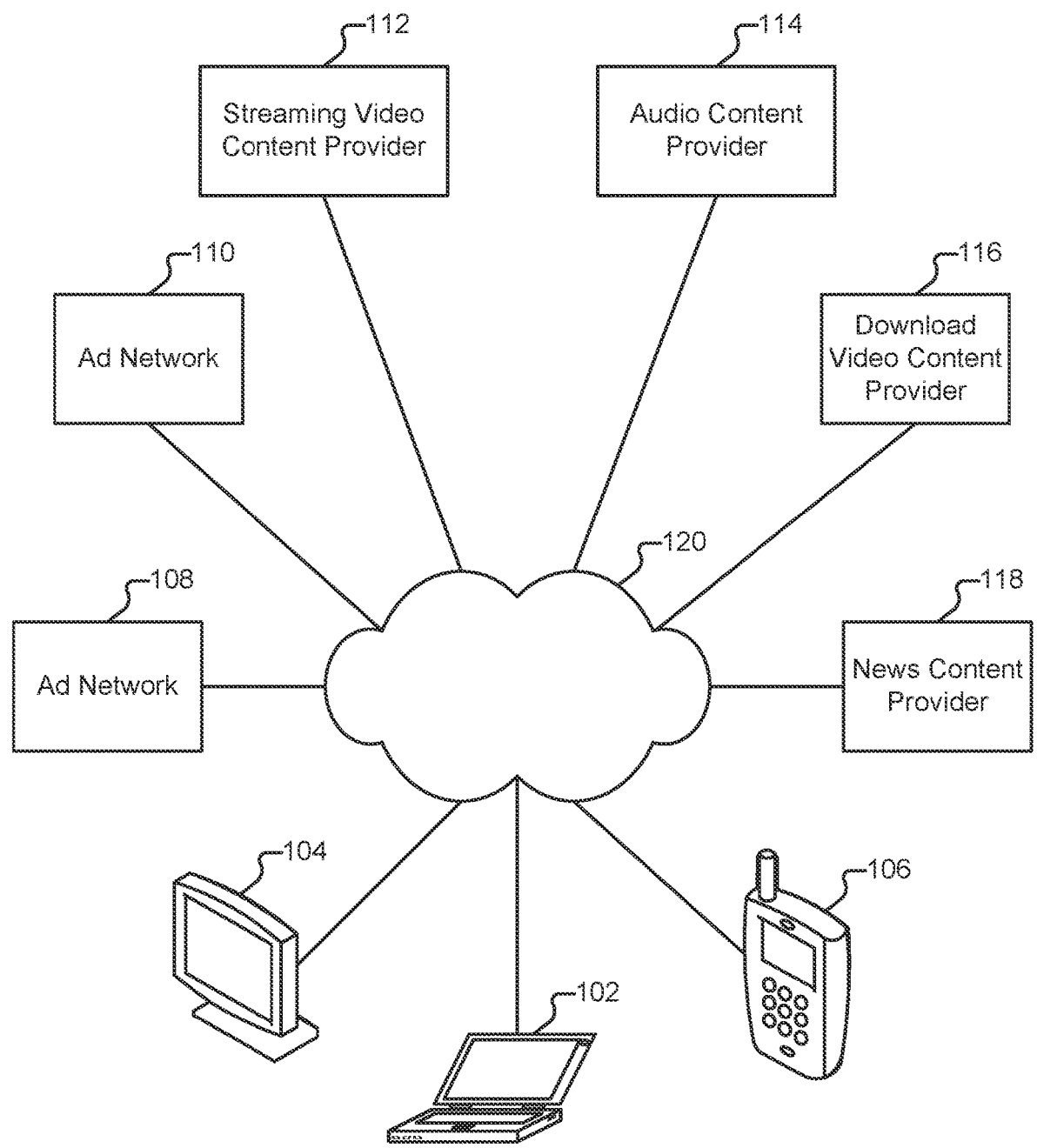
FIG. 1 illustrates an example of an environment in which advertisements are delivered.

FIG. 1 illustrates an example of an environment in which advertisements are delivered. Clients 102-106 each interact with various content providers 112-118 via one or more networks represented herein as a single network cloud 120. In various embodiments, network cloud 120 includes the Internet and assorted intranets. For example, clients 102 and 104 are both nodes on the same corporate network and both are also connected to content providers 112-118 via the Internet. Ad networks 108 and 110 supply advertisements to be shown to clients 102-106. As described in more detail below, in some cases the advertisements are served to clients 102-106 directly by ad networks 108 and 110. Ad networks 108 and 110 may also supply pointers or references to advertisements to clients 102-106 and the advertisements themselves may be delivered by a third party, including via a peer-to-peer network.

In the example shown, clients 102 and 104 are typical personal computers and include components such as a storage drive, RAM, and one or more processors. Client 102 has installed on it a typical web browser which can be used (e.g., by a user hereinafter referred to as "Alice") to access content provided by content providers such as content providers 112-118.

Client 104 has installed on it an application that facilitates the streaming of content such as video. The application is configured to receive content from streaming video provider 112 and to redistribute the content to other nodes using peer-to-peer techniques.

Client 106 is a handheld device such as a web-enabled cellular phone that allows users to access content provided by content providers such as content providers 112-118 using a browser application. Client 106 includes a slower processor and less RAM than client 102 and also makes use of a small flash-based drive for storage. In various embodiments, client 106 includes applications instead of or in addition to the browser application that allow a user to access content provided by the content providers. For example, audio content provider may expose its content to assorted applications via a set of APIs, one of which is installed on client 106. Other examples of clients (not shown) such as personal digital assistants, set-top boxes, game consoles, broadband routers, and digital video recorders, may also be used in conjunction with the techniques described herein as applicable.

Each of content providers 112-118 serves content, such as text/HTML, streaming audiovisual content, and downloadable audiovisual content to clients such as clients 102-106. In the example shown, streaming video content provider 112 is a website that allows visitors to watch live video feeds (e.g., of sporting or news events) and also allows visitors to stream other video content such as movies and television episodes. Users of streaming video content provider 112 also redistribute content that they receive to other users via peer-to-peer techniques. Audio content provider 114 allows users to stream audio content, and also allows users to download entire songs for later playback. Download video content provider 116 allows users to purchase (or rent) video content for later playback on a client, including playback when the client is not connected to network cloud 120. News content provider 118 is a website that provides users with access to news content such as news articles and photographs.

Ad networks 108 and 110 have agreements with content providers 112-118 to facilitate the serving of advertisements to clients 102-106. In the example shown, ad network 108 comprises a single server and ad network 110 comprises several hundred servers working in conjunction. As described in more detail below, ad networks 108 and 110 send a plurality of advertisements to clients 102-106 in response to requests sent by the clients. A decision of which of the received advertisements to display is made locally at the client based in part on locally collected and locally maintained information about the user of the client.

Figure 2:
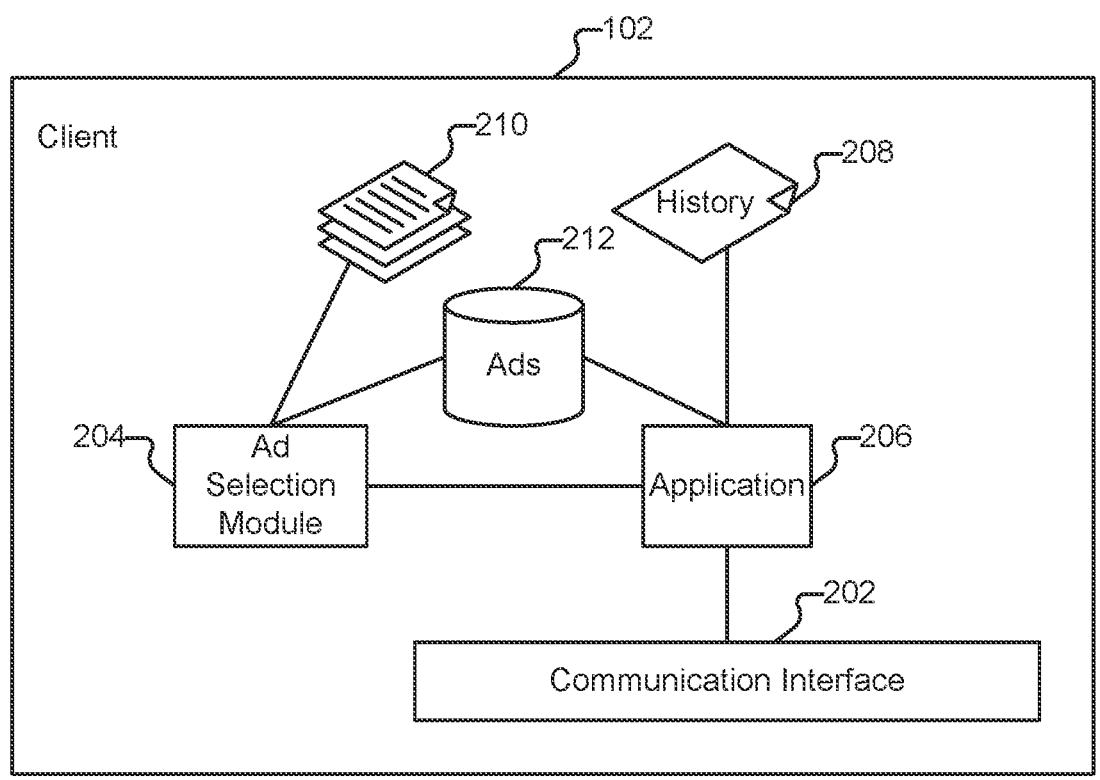
FIG. 2 illustrates an example of an embodiment of a client.

FIG. 2 illustrates an example of an embodiment of a client. In the example shown, client 102 includes a communication interface 202 that is used by client 102 to communicate with other devices/systems that are accessible via network cloud 120. For example, client 102 communicates with publisher 112 and ad network 110 via communication interface 202. Application 206 is a commercially available web browser such as MICROSOFT INTERNET EXPLORER, MOZILLA FIREFOX, or APPLE SAFARI. Whenever client 102 performs a task (such as selecting an advertisement), either a single component or a subset of components or all components client 102 may cooperate to perform the task.

Application 206 is in communication with an ad selection module 204. In some embodiments ad selection module is a separately installed program. In other embodiments, ad selection module is a lightweight client that is provided to application 206 as a JAVA applet, ADOBE FLASH content, SILVERLIGHT component or via a similar platform.

As described in more detail below, client 102 receives and in some embodiments stores a plurality of advertisements 212. When application 206 retrieves content from content providers 112-118, ad selection module 204 facilitates the decision of which advertisement(s) should be presented to Alice in conjunction with the content.

In the example shown, ad selection module 204 is configured to support different instructions from different publishers and ad networks with respect to making decisions of which advertisements to show. For example, when Alice uses browser 206 to access publisher 114, one set of rules may be applied (e.g., based on instructions from content provider 114 and ad network 110). When Alice uses browser 206 to access content for which the publisher has an agreement with ad network 108, a different set of rules may be applied.

Ad selection module 204 makes its decision based in part on locally collected information such as browsing history 208 that is collected by web browser 206, as well as other information 210. Browsing history 208 stores information such as the websites that Alice has recently visited and the files that she has recently downloaded. Examples of other locally collected information 210 include locality/language preference settings (e.g., obtained from client 102's operating system), information such as what other applications are also installed on client 102, the hardware used by client 102, and data that augments browsing history 208 such as the amount of time spent viewing various content.

In some embodiments Alice is presented with a questionnaire when ad selection module 204 is first configured on client 102. The questionnaire may solicit information such as socio-economic and demographic information, and information about Alice's likes and dislikes. In various embodiments, the questionnaire explains to Alice that her answers will be stored in a secure manner on client 102 and will not be transmitted by client 102 to content publishers or ad networks. Information 210 (and in some cases 208) is stored in an encrypted manner in some embodiments. As explained in more detail below, Alice may also receive instructions that some of her information may be reported to an intermediary but that the intermediary will anonymize or aggregate Alice's personal information prior to providing it to an entity such as an ad network.

In some embodiments historical and personal information is stored only locally, and is stored in an encrypted format. The encryption precludes an attacker from obtaining this information, even if the attacker were successful in compromising Alice's machine.

Figure 3:
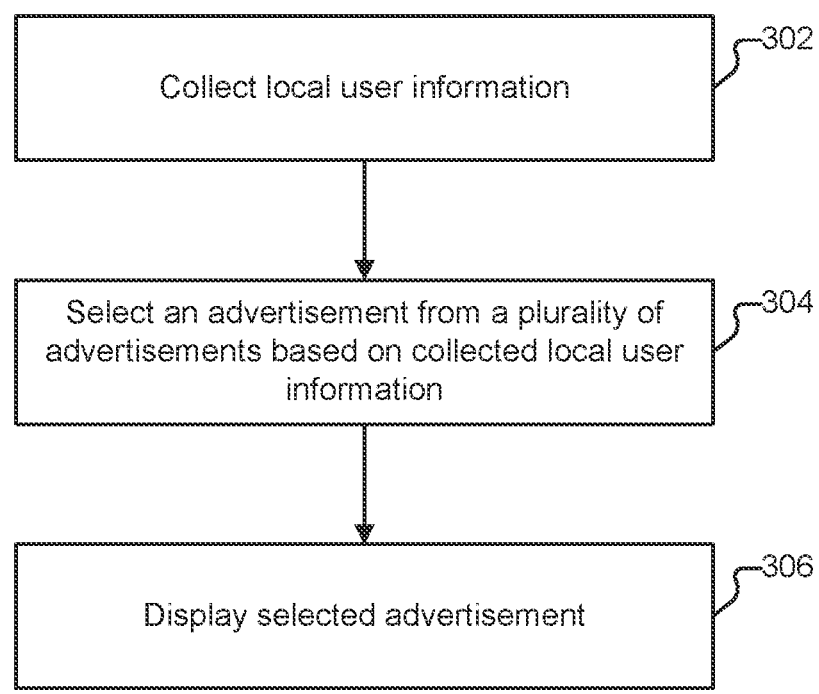
FIG. 3 is a flow chart illustrating an embodiment of a process for delivering an advertisement.

FIG. 3 is a flow chart illustrating an embodiment of a process for delivering an advertisement. In various embodiments the process shown in FIG. 3 is performed by a client such as client 102. The process begins at 302 when user information is locally collected. For example, at 302, browser history information such as what pages Alice has visited recently, how much time Alice has spent viewing a particular video or reading a particular article, etc., is collected. In various embodiments other local information 210 is collected instead of or in addition to information 208. The processing performed at 302 may occur once (e.g., when soliciting Alice's responses to an install-time questionnaire) and may also be repeated periodically, such as by examining information 208 on a weekly basis, every time Alice starts her computer, etc. In various embodiments, client 102 is configured to allow Alice to purge or otherwise remove at least some of the information collected at 302. For example, Alice may erase information 108 or delete/modify her answers to the install-time questionnaire if she feels so inclined. By storing and collecting most of the user information locally without transmitting the information to another party, the system protects the user's privacy.

At 304 an advertisement is selected by client 102 based on the information collected at 302, and on the information (metadata) provided by the publisher about the video feed it streams to Alice. As described in more detail below, the advertisement is selected from a set of candidate advertisements and a variety of techniques can be used to select the advertisement. For example, suppose Alice is using browser 206 to watch a live streaming car racing event as provided by streaming video content provider 112.

As described in more detail below, content provider 112 provides browser 206 with the video feed of the race, as well as metadata that describes the content Alice is viewing (e.g., "The XYZ Racing Event," "sports," "cars," "car race,"

"Channel 2," "XYZ network," etc.) In various embodiments, ad network 108, client 102, and streaming video content provider 112 use a common taxonomy structure for identifying (or "tagging") content with descriptive metadata.

For example, in some embodiments the ads stored at client 102, as well as the entries in history 208 are categorized using a directory system (taxonomy) such as Yahoo! Directory (http://dir.yahoo.com/), Google Directory (http://directory.google.com/), or the open source Dmoz directory (http://www.dmoz.org/). This directory may be shared between the publisher and the ad network. The publisher uses categories from the directory to tag its streams. For example, assume the publisher has tagged the stream watched by Alice with the "car" category. Also suppose that recently, Alice has visited acmecars.com, and that among the ads stored locally there is an ad for an ACME Brand car. Since "ACME" is a subcategory of "car," ad selection module 204 selects the ACME ad for display. If no ACME ad is available locally, module 204 may decide to select another luxury car ad, since ACME is a luxury brand, and "luxury" is a subcategory of "car." Alternatively, if no ACME ad is available locally, module 204 may contact the ad network requesting a set of ads pertaining to ACME cars. Note that even in this scenario, the ad network would not be informed as to why Alice's computer wishes to display an ACME car advertisement (e.g., because she looked at a particular page on a particular day) or any other information about Alice—just that client 102 has determined that it would like to display an ACME ad and does not have one stored locally.

Referring to FIGS. 1 and 2, ad selection module 204 sends information such as the received metadata to ad network 110 and receives back instructions on which advertisements should be considered by client 102 when selecting an advertisement. For example, suppose advertising network currently maintains a total of 500 advertisements in its inventory. Of those advertisements, 75 are potentially applicable to car racing (e.g., advertisements for cars, advertisements for new tires, advertisements for oil change services, and advertisements not directly related to cars but which might nonetheless be of interest such as advertisements for soda, fast food, and power tools).

Ad network 110 instructs client 102 to select an advertisement from among the 75 candidate advertisements to be considered for displaying to Alice. In some embodiments ad network 110 instructs client 102 by sending all 75 candidate advertisements to client 102, which in turn stores all 75 candidate advertisements locally. In other embodiments, Ad network 110 does not send all 75 candidate advertisements in their entirety, but instead sends information about each of the advertisements (such as the name of the merchant, the name of the product being advertised, target characteristics of a viewer of the advertisement, etc.) including information on where to obtain the advertisement itself if selected by client 102. For example, client 102 is a typical personal computer with ample storage and a fast network connection. Accordingly, client 102 may have sufficient resources to download 75 video-clip advertisements. In contrast, client 106 is a handheld device with limited storage and a slower network connection and may initially receive only information about the advertisements instead of the advertisements themselves. In various embodiments, information about the capabilities of the client is sent to ad network 110 so that it may select an appropriate number (and type) of advertisements for the client. For example, in some embodiments client 106 receives still-photograph advertisements instead of video advertisements, or receives 10 video-clip advertisements instead of all 75 video-clip advertisements, as applicable. Other examples of types of advertisements include audio advertisements that can, for example, be played to Alice over speakers installed on client 102 while Alice reads news articles provided by news content provider 118, overlay and other interactive advertisements (e.g., that ask Alice to perform an action such as clicking on a box or providing an email address), etc.

As part of the metadata associated with an ad, the ad network may specify an (1) expiration time and/or a (2) counter. The expiration time specifies the time interval during which module 204 can select the ad, and the counter specifies the number of times module 204 can select the ad to be displayed. If the counter reaches 0 or the expiration time is exceeded, the ad is removed from module 212.

The computing capabilities of clients 102-106 to be devoted to the selecting of advertisements can, in some embodiments, be customized by a user, can be determined automatically at the time ad selection module 204 is configured, and can be periodically reevaluated, as applicable.

Examples of factors that client 102 can consider when selecting from among the 75 candidate advertisements include (1) the application that is being used to view the content (e.g., a web browser vs. a dedicated content player); (2) the metadata associated with the content viewed by Alice; (3) whether any of the advertisements have already been displayed to Alice; (4) whether any advertisements having similar attributes have recently been displayed to Alice (e.g., so that she isn't shown four automobile advertisements, or four advertisements for different soft drinks in a row); (5) whether any of the advertisements have any applicable expiration dates; (6) what web pages Alice has recently viewed (e.g., if she has recently visited acmecars.com, select an advertisement for an ACME brand car; if she tends to visit financial web sites, select an ad for a luxury model car; if she tends to visit websites that indicate she is youthful (such as social networking sites, rock band web sites, etc.), select an economy model car advertisement); (7) what content Alice has recently viewed (e.g., prior to the car race Alice watched a nature documentary about bears and prior to that she watched a specific episode of a television comedy); (8) any actions Alice has recently taken with respect to other applications (e.g., is she exclusively watching the race or is she also reading her email/writing a document in another window); (9) the language setting of Alice's operating system; (10) Alice's geolocation (e.g., show a convertible model car if she is located in Florida and show a sport utility vehicle model car if she is located in Seattle); (11) preferences Alice has previously indicated for or against advertisements, etc.

Client 102 can also consider external factors in making its selection. For example, while a particular car insurance advertisement may be a good fit with Alice's personal information, if the car insurance advertisement has already been widely shown to other users, the car insurance company may not have enough of an advertising budget left to pay for the advertisement to be shown to Alice. In various embodiments, client 102 is configured to periodically check for information such as expiration dates and play count limits on advertisements.

In several of the aforementioned examples, the information that can be learned about Alice and her computer activities is potentially very sensitive. For example, Alice may have recently used her web browser to learn about a medical condition with which she has recently been diagnosed. Alice doesn't want an advertiser to know that she has the medical condition, but she might nonetheless benefit from being presented with an advertisement from a pharmaceutical company that pertains to the condition. Using the techniques described herein, client 102 might indicate to advertising network 110 that the set of candidate advertisements to be sent to Alice should include pharmaceutical advertisements. In response, advertising network 110 might provide client 102 with a wide range of advertisements for products such as hair-regrowth pharmaceutics, diabetes medicine, an advertisement pertaining to Alice's condition, and a variety of public-service messages. Client 102 would select the most appropriate advertisement (the one pertaining to Alice's medical condition) for display to Alice without advertising network 110 being able to learn that Alice has or is interested in the medical condition.

At 306 the selected advertisement is displayed. In some embodiments the selected advertisement is displayed to the user immediately after it is selected (e.g., using the processing performed at 304). This may be the case, for example, if client has a high quality connection to network 120. For example, live sporting events typically include time-outs or other pauses in programming during which advertisements can be shown. When such a pause occurs (or some unit of time prior to the pause, if applicable), client 102 can query advertising network 110 for a batch of candidate advertisements to be shown, make a selection, and immediately show the selected advertisement.

In some embodiments multiple advertisements to be displayed are selected at 304 and placed in a queue for later display to client 102. For example, suppose when Alice begins watching the car race, client 102 contacts ad network 110 and receives 75 video advertisements. The race is estimated to last four hours. During that time, Alice will be shown a total of twenty advertisements. Instead of contacting ad network 110 twenty times, client 102 can instead select advertisements to fill those twenty slots based on the 75 received advertisements. Client 102 may fill the slots using twenty distinct advertisements. Client 102 may also determine that certain advertisements should be repeated—instead selecting a total of seven advertisements to be used in the twenty slots. If Alice stops watching the racing program and instead begins watching a different live event, or if she switches to reading news articles provided by news content provider 118, Alice may nonetheless continue to be shown car-related advertisements. One reason for this is that Alice is (locally) known to enjoy car racing, and so irrespective of whether she is currently watching a program that is related to racing, she is still likely to be interested in an automobile-oriented advertisement.

In some cases, advertisements received while client 102 is connected to network 120 are displayed to client 102 while it is disconnected from network 102. For example, suppose Alice downloads content such as feature length movies and television episodes that she intends to watch on an airplane during an upcoming trip. In some embodiments advertisements to be displayed in conjunction with the downloaded content are obtained from ad network 110 at the time she obtains the downloaded content. When Alice later views the content (while not connected to network 120), ad selection module 204 can nonetheless select an appropriate advertisement to display from among those it previously received from ad network 110 and cause the selected advertisement to be displayed while client 102 is not connected to the network.

In various embodiments, Alice periodically receives at client 102 a set of advertisements (e.g., from ad network 110), not in response to a specific request. For example, client 102 may be configured to receive 200 still-image advertisements each week and to receive 100 video advertisements each month from ad network 108. Such sets may also be propagated through a peer-to-peer network or obtained from a party other than ad network 108. The advertisements may pertain to a wide variety of products and services, some of which will be of interest to Alice (car insurance) and many of which will not be of interest to Alice (e.g., golfing vacations, diapers, etc.) Along with the sets of advertisements, client 102 also receives information such as metadata that describes attributes of each advertisement such as the category (e.g., food advertisement, car advertisement), the merchant (e.g., "Acme Motors") and suggested attributes of a target viewer of the advertisement (e.g., women under 35). In such a scenario, rather than providing information about the content that Alice is consuming to ad network 110 and receiving a set of relevant candidate advertisements, client 102 determines the set of candidate advertisements itself (e.g., those pertaining to automobiles and not pertaining to golf) and then selects a specific advertisement using the processing of portion 304 of the process shown.

Figure 4:
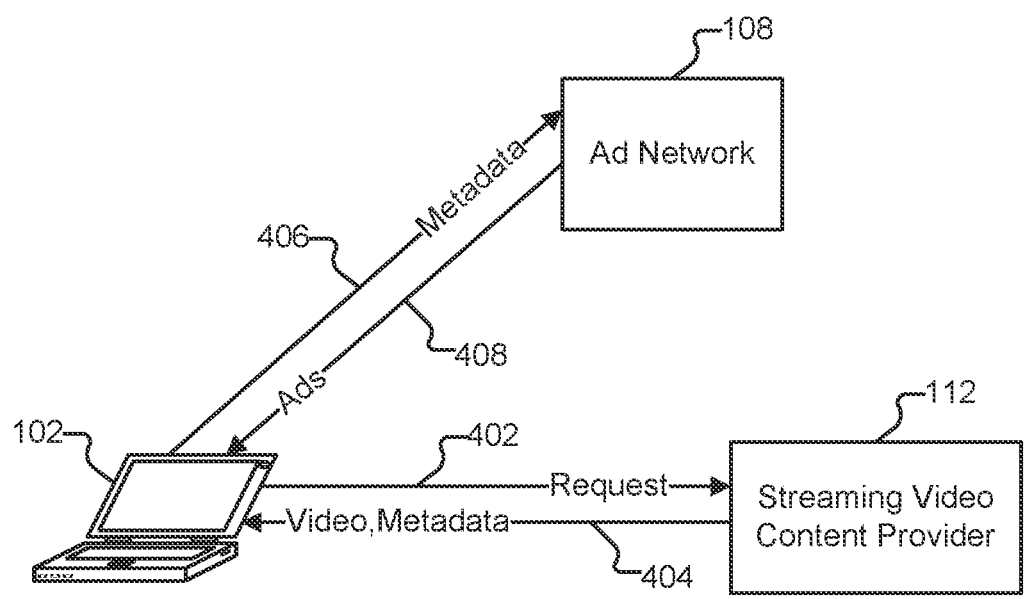
FIG. 4 illustrates an example of an environment in which advertisements are delivered.

FIG. 4 illustrates an example of an environment in which advertisements are delivered. In the example shown, Alice has instructed client 102 that she would like to watch an automobile race, the video feed for which is provided by streaming video content provider 112 (402). In response, streaming video content provider 112 sends client 102 the video feed and also metadata that describes the feed (404). Client 102 provides the received metadata to ad network 108 (406). In some embodiments the request also includes information such as an ad type (video vs. image vs. audio), an ad size (e.g., to fit in a banner area vs. a skyscraper area), and any other applicable information. In response, ad network 108 provides client 102 with a set of advertisements (408). Client 102 will select one or more advertisements to display to Alice based on information collected locally by client 102.

Figure 5:
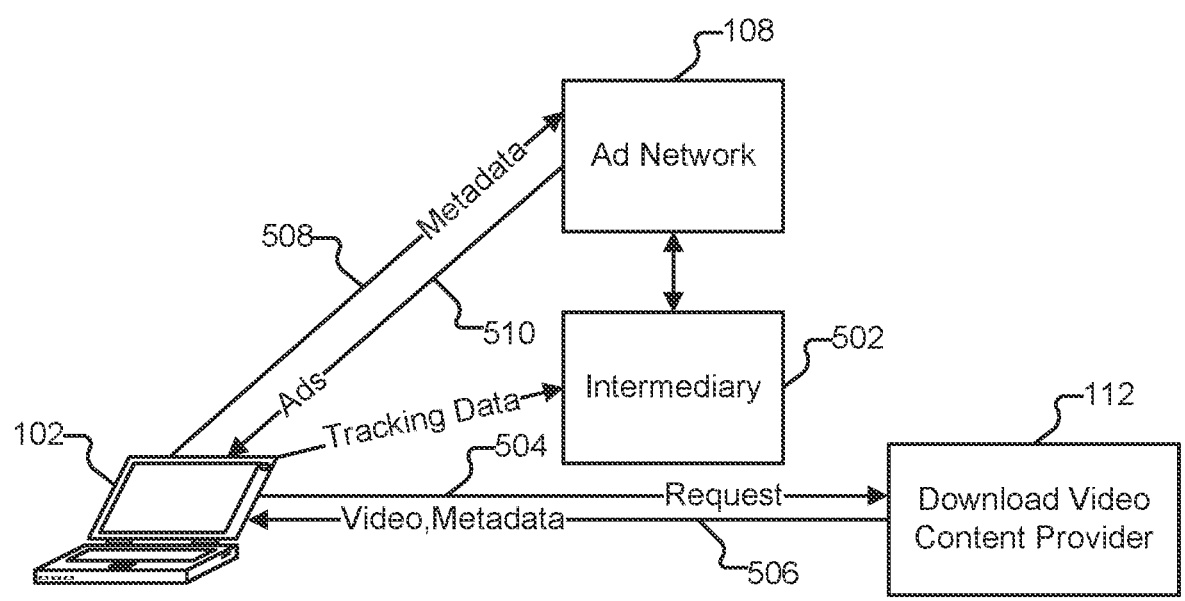
FIG. 5 illustrates an example of an environment in which advertisements are delivered.

FIG. 5 illustrates an example of an environment in which advertisements are delivered. In the example shown, Alice has instructed client 102 that she would like to download a feature length film from download video provider 112 for later playback (504). In response, download video content provider 112 sends Alice the film file and metadata that describes the film (506). Client 102 provides the received metadata to ad network 108 (508). In response, ad network 108 provides client 102 with a set of advertisements (510). Client will select one or more advertisements to display to Alice based on information collected locally by client 102.

In the example shown, client 102 provides intermediary 502 with tracking data that documents which advertisements were displayed to Alice. In some embodiments the information provided to intermediary 502 is a count of how many particular times a specific advertisement was displayed. In other embodiments more detailed information such as when the advertisement was shown, demographic information about Alice, etc., is also provided. Intermediary 502 aggregates the tracking data received from client 102 along with tracking data received from other clients (not shown). Intermediary 502 provides the aggregate information to advertising network 108. The tracking data can be used for a variety of purposes such as allowing advertisers to track how often their advertisements are shown, to confirm that their advertisements are being viewed by the appropriate target demographic, etc. In various embodiments intermediary 502 is the same entity that provides ad selection module 204 to client 102 and may have its own repository of demographic information about users such as Alice that it uses when aggregating information on behalf of advertising network 108 instead of or in addition to demographic information being provided to intermediary 502 by client 102.

In various embodiments, tracking information is provided directly to advertising network 108 by client 102 instead of or in addition to intermediary 502.

While providing tracking information directly to ad network 108 may reveal more information about Alice than using intermediary 502, this information is still limited. Knowing the ads Alice has watched or clicked on does not allow ad network 108 to learn the information (i.e., history, personal information) used by ad selection module 204 to select the ads.

In some embodiments, to improve privacy when client 102 provides tracking information directly to ad network 108, client 102 probabilistically alters the tracking information. For example, when ad A is shown to Allice, client 102 may send to ad network 108 the information that Alice has seen A with a probability "p," and that she has seen another random ad stored at module 212 with a probability "1-p," where "p" is close to 1. In this scheme, ad network 108 will not be able to be sure of which ad has Alice seen and when. However, as long as the ad network knows "p" it will be able to accurately estimate how many times has an ad being watched using a statistically large set of viewers.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A client device, comprising:
a communication interface configured to:
transmit, to a remote entity, information pertaining to capabilities of the client device, the capabilities of the client device comprising storage resources and network resources associated with the client device, wherein the remote entity is configured to:
receive the information transmitted by the client device pertaining to the capabilities of the client device;
based at least in part on the received information pertaining to the capabilities of the client device, select at least one of a number or a type of advertisements to include in a plurality of advertisements to be provided to the client device, wherein based at least in part on at least one of the storage resources or the network resources associated with the client device:
applicable candidate video-clip advertisements are included in the plurality of advertisements in an event that the client device has sufficient storage and network resources to download the applicable candidate video-clip advertisements; or
information pertaining to the applicable candidate video-clip advertisements is included in the plurality of advertisements instead of the applicable candidate video-clip advertisements themselves in an event that the client device has limited storage and a slower network connection; and
transmit, to the client device, the plurality of advertisements comprising the at least one of the number or the type of advertisements selected for the client device based at least in part on the received information pertaining to the capabilities of the client device; and
receive, from the remote entity, the plurality of advertisements comprising the at least one of the number or the type of advertisements selected for the client device based at least in part on the received information pertaining to the capabilities of the client device;
one or more processors configured to:
collect and store user information locally at the client device, without transmitting the user information to another party;
based at least in part on the locally collected and stored user information, locally select, by an advertisement selection module, an advertisement from the plurality of advertisements received from the remote entity comprising the at least one of the number or the type of advertisements selected for the client device based at least in part on the information pertaining to the capabilities of the client device transmitted to the remote entity, and wherein computing capabilities of the client device devoted to local selecting of advertisements are at least one of user customizable, determined automatically at a time that the advertisement selection module is configured, or periodically reevaluated;
cause the selected advertisement to be displayed locally; and
based at least in part on causing the selected advertisement to be displayed locally, provide tracking information to an external entity, including:
sending first information to the external entity indicating that the selected advertisement was observed by a user with a first probability; and
sending second information to the external entity indicating that a randomly selected advertisement stored at the client device and that is different from the selected advertisement was observed by the user with a second probability different from the first probability, wherein the second probability comprises the first probability subtracted from one; and
a memory coupled to the one or more processors and configured to provide the one or more processors with instructions.

2. The client device of claim 1, wherein the communication interface is further configured to receive metadata from a publisher.

3. The client device of claim 1, wherein the communication interface is further configured to send metadata to an advertising network.

4. The client device of claim 1, wherein the plurality of advertisements is received from an advertising network.

5. The client device of claim 1, wherein the communication interface is further configured to receive at least one advertisement via a peer-to-peer network.

6. The client device of claim 1, wherein the selected advertisement comprises audiovisual content.

7. The client device of claim 1, wherein the one or more processors are configured to locally select the advertisement based at least in part on an expiration date associated with the advertisement.

8. The client device of claim 1, wherein the one or more processors are configured to locally select the advertisement based at least in part on how many times the advertisement has been displayed to third parties.

9. The client device of claim 1, wherein the one or more processors are configured to locally select the advertisement based at least in part on how many times the advertisement has been displayed locally.

10. The client device of claim 1, wherein each of the advertisements in the plurality of advertisements is associated with at least one attribute and wherein the one or more processors are configured to locally select the advertisement based at least in part on whether a threshold number of advertisements having an attribute associated with the selected advertisement has previously been locally displayed.

11. The client device of claim 1, wherein the one or more processors are configured to locally collect the user information at least in part by determining a language setting.

12. The client device of claim 1, wherein the one or more processors are configured to locally collect the user information at least in part by examining a web browser history.

13. The client device of claim 1, wherein the one or more processors are configured to locally collect the user information at least in part by providing a questionnaire to the user.

14. The client device of claim 1, wherein the one or more processors are configured to locally collect the user information at least in part by recording a user's actions with respect to a plurality of local applications.

15. The client device of claim 1, wherein the one or more processors are configured to locally collect the user information at least in part by determining what content the user is currently accessing.

16. The client device of claim 1, wherein the one or more processors are configured to locally collect the user information at least in part by determining what content the user has previously accessed.

17. The client device of claim 1, wherein the one or more processors are configured to locally collect the user information at least in part by storing metadata associated by a publisher with content accessed by the user.

18. The client device of claim 1, wherein the communication interface is further configured to communicate to a third party that the selected advertisement was displayed.

19. The client device of claim 1, wherein the plurality of advertisements is received over a network, and wherein the one or more processors are such that the selected advertisement can be caused to be displayed when the communication interface is not connected to the network.

20. A method, comprising:
transmitting, to a remote entity and via a communication interface included in a client device, information pertaining to capabilities of the client device, the capabilities of the client device comprising storage resources and network resources associated with the client device, wherein the remote entity is configured to:
receive the information transmitted by the client device pertaining to the capabilities of the client device;
based at least in part on the received information pertaining to the capabilities of the client device, select at least one of a number or a type of advertisements to include in a plurality of advertisements to be provided to the client device, wherein based at least in part on at least one of the storage resources or the network resources associated with the client device:
applicable candidate video-clip advertisements are included in the plurality of advertisements in an event that the client device has sufficient storage and network resources to download the applicable candidate video-clip advertisements; or
information pertaining to the applicable candidate video-clip advertisements is included in the plurality of advertisements instead of the applicable candidate video-clip advertisements themselves in an event that the client device has limited storage and a slower network connection; and
transmit, to the client device, the plurality of advertisements comprising the at least one of the number or the type of advertisements selected for the client device based at least in part on the received information pertaining to the capabilities of the client device;
receiving, from the remote entity and via the communication interface, the plurality of advertisements comprising the at least one of the number or the type of advertisements selected for the client device based at least in part on the received information pertaining to the capabilities of the client device;
collecting and storing user information locally at the client device, without transmitting the user information to another party;
based at least in part on the locally collected and stored user information, locally selecting, by an advertisement selection module and using one or more processors included in the client device, an advertisement from the plurality of advertisements received from the remote entity comprising the at least one of the number or the type of advertisements selected for the client device based at least in part on the information pertaining to the capabilities of the client device transmitted to the remote entity, and wherein computing capabilities of the client device devoted to local selecting of advertisements are at least one of user customizable, determined automatically at a time that the advertisement selection module is configured, or periodically reevaluated;
causing the selected advertisement to be displayed locally; and
based at least in part on causing the selected advertisement to be displayed locally, providing tracking information to an external entity, including:
sending first information to the external entity indicating that the selected advertisement was observed by a user with a first probability; and
sending second information to the external entity indicating that a randomly selected advertisement stored at the client device and that is different from the selected advertisement was observed by the user with a second probability different from the first probability, wherein the second probability comprises the first probability subtracted from one.

21. The method of claim 20, further comprising receiving, via the communication interface, metadata from a publisher.

22. The method of claim 20, further comprising sending, via the communication interface, metadata to an advertising network.

23. The method of claim 20, wherein the plurality of advertisements is received from an advertising network.

24. The method of claim 20, further comprising receiving, via the communication interface, at least one advertisement via a peer-to-peer network.

25. The method of claim 20, wherein the selected advertisement comprises audiovisual content.

26. The method of claim 20, further comprising locally selecting the advertisement based at least in part on an expiration date associated with the advertisement.

27. The method of claim 20, further comprising locally selecting the advertisement based at least in part on how many times the advertisement has been displayed to third parties.

28. The method of claim 20, further comprising locally selecting the advertisement based at least in part on how many times the advertisement has been displayed locally.

29. The method of claim 20, wherein each of the advertisements in the plurality of advertisements is associated with at least one attribute and further comprising locally selecting the advertisement based at least in part on whether a threshold number of advertisements having an attribute associated with the selected advertisement has previously been locally displayed.

30. The method of claim 20, further comprising locally collecting the user information at least in part by determining a language setting.

31. The method of claim 20, further comprising locally collecting the user information at least in part by examining a web browser history.

32. The method of claim 20, further comprising locally collecting the user information at least in part by providing a questionnaire to the user.

33. The method of claim 20, further comprising locally collecting the user information at least in part by recording a user's actions with respect to a plurality of local applications.

34. The method of claim 20, further comprising locally collecting the user information at least in part by determining what content the user is currently accessing.

35. The method of claim 20, further comprising locally collecting the user information at least in part by determining what content the user has previously accessed.

36. The method of claim 20, further comprising locally collecting the user information at least in part by storing metadata associated by a publisher with content accessed by the user.

37. The method of claim 20, further comprising communicating, via the communication interface, to a third party that the selected advertisement was displayed.

38. The method of claim 20, wherein the plurality of advertisements is received over a network, and the selected advertisement can be caused to be displayed when the communication interface is not connected to the network.

39. A computer program product embodied in a computer readable storage medium and comprising computer instructions for:
  transmitting, to a remote entity and via a communication interface included in a client device, information pertaining to capabilities of the client device, the capabilities of the client device comprising storage resources and network resources associated with the client device, wherein the remote entity is configured to:
    receive the information transmitted by the client device pertaining to the capabilities of the client device;
    based at least in part on the received information pertaining to the capabilities of the client device, select at least one of a number or a type of advertisements to include in a plurality of advertisements to be provided to the client device, wherein based at least in part on at least one of the storage resources or the network resources associated with the client device:
      applicable candidate video-clip advertisements are included in the plurality of advertisements in an event that the client device has sufficient storage and network resources to download the applicable candidate video-clip advertisements; or
      information pertaining to the applicable candidate video-clip advertisements is included in the plurality of advertisements instead of the applicable candidate video-clip advertisements themselves in an event that the client device has limited storage and a slower network connection; and
    transmit, to the client device, the plurality of advertisements comprising the at least one of the number or the type of advertisements selected for the client device based at least in part on the received information pertaining to the capabilities of the client device;
  receiving, from the remote entity and via the communication interface, the plurality of advertisements comprising the at least one of the number or the type of advertisements selected for the client device based at least in part on the received information pertaining to the capabilities of the client device;
  collecting and storing user information locally at the client device, without transmitting the user information to another party;
  based at least in part on the locally collected and stored user information, locally selecting, by an advertisement selection module and using one or more processors included in the client device, an advertisement from the plurality of advertisements received from the remote entity comprising the at least one of the number or the type of advertisements selected for the client device based at least in part on the information pertaining to the capabilities of the client device transmitted to the remote entity, and wherein computing capabilities of the client device devoted to local selecting of advertisements are at least one of user customizable, determined automatically at a time that the advertisement selection module is configured, or periodically reevaluated;
  causing the selected advertisement to be displayed locally; and
  based at least in part on causing the selected advertisement to be displayed locally, providing tracking information to an external entity, including:
    sending first information to the external entity indicating that the selected advertisement was observed by a user with a first probability; and
    sending second information to the external entity indicating that a randomly selected advertisement stored at the client device and that is different from the selected advertisement was observed by the user with a second probability different from the first probability, wherein the second probability comprises the first probability subtracted from one.

* * * * *